United States Patent [19]

Yamamoto et al.

[11] Patent Number: 5,551,524
[45] Date of Patent: Sep. 3, 1996

[54] REMOTE CONTROL APPARATUS OF A CONSTRUCTION MACHINE

[75] Inventors: Shigeru Yamamoto; Shigenori Matsushita; Kazushi Nakata; Nobuhisa Kamikawa, all of Hirakata, Japan

[73] Assignee: Kabushiki Kaisha Komatsu Seisakusho, Tokyo, Japan

[21] Appl. No.: 360,047

[22] Filed: Dec. 20, 1994

[30] Foreign Application Priority Data

Dec. 24, 1993 [JP] Japan .................................. 5-327830

[51] Int. Cl.⁶ .......................................... B62D 11/08
[52] U.S. Cl. .................................. 180/6.62; 364/424.05; 364/424.07; 901/1; 180/167
[58] Field of Search .......................... 180/167, 6.2, 6.62; 364/424, 424.05, 424.07; 901/1; 414/4, 5; 91/459

[56] References Cited

U.S. PATENT DOCUMENTS 5,365,737 11/1994 Moriya et al. ............................ 60/469
5,375,686 12/1994 Yamamoto .............................. 180/6.2 X

FOREIGN PATENT DOCUMENTS 51-41702 10/1976 Japan .
57-28945 6/1982 Japan .
2-48602 4/1990 Japan .
2-27194 6/1990 Japan .
4-19679 2/1992 Japan .
4-285302 10/1992 Japan .
5-20978 3/1993 Japan .
5-282035 10/1993 Japan .

*Primary Examiner*—Kevin T. Hurley
*Attorney, Agent, or Firm*—Diller, Ramik & Wight, PC

[57] ABSTRACT

A remote control apparatus of a construction machine in which steering control is performed by hydraulically controlling the steering clutches and the steering brakes, comprises remote operating unit for generating a first steering command for turning on or off the steering clutches of the construction machine and a second steering command for turning on or off the steering brakes of the construction machine, steering operation of the construction machine being controlled by the first and second steering commands; and a control unit provided in the construction machine, for performing a control in such a manner that when the first steering command becomes on, the steering clutches are released for a duration during which the first steering command is on, and when the second steering command becomes on in the duration during which the first steering command is on, hydraulic pressure of the steering brakes is gradually changed from a releasing side to a braking side with a predetermined gradient. With the control unit, operations can be smooth at the starting time and fine steering control can be realized.

4 Claims, 6 Drawing Sheets

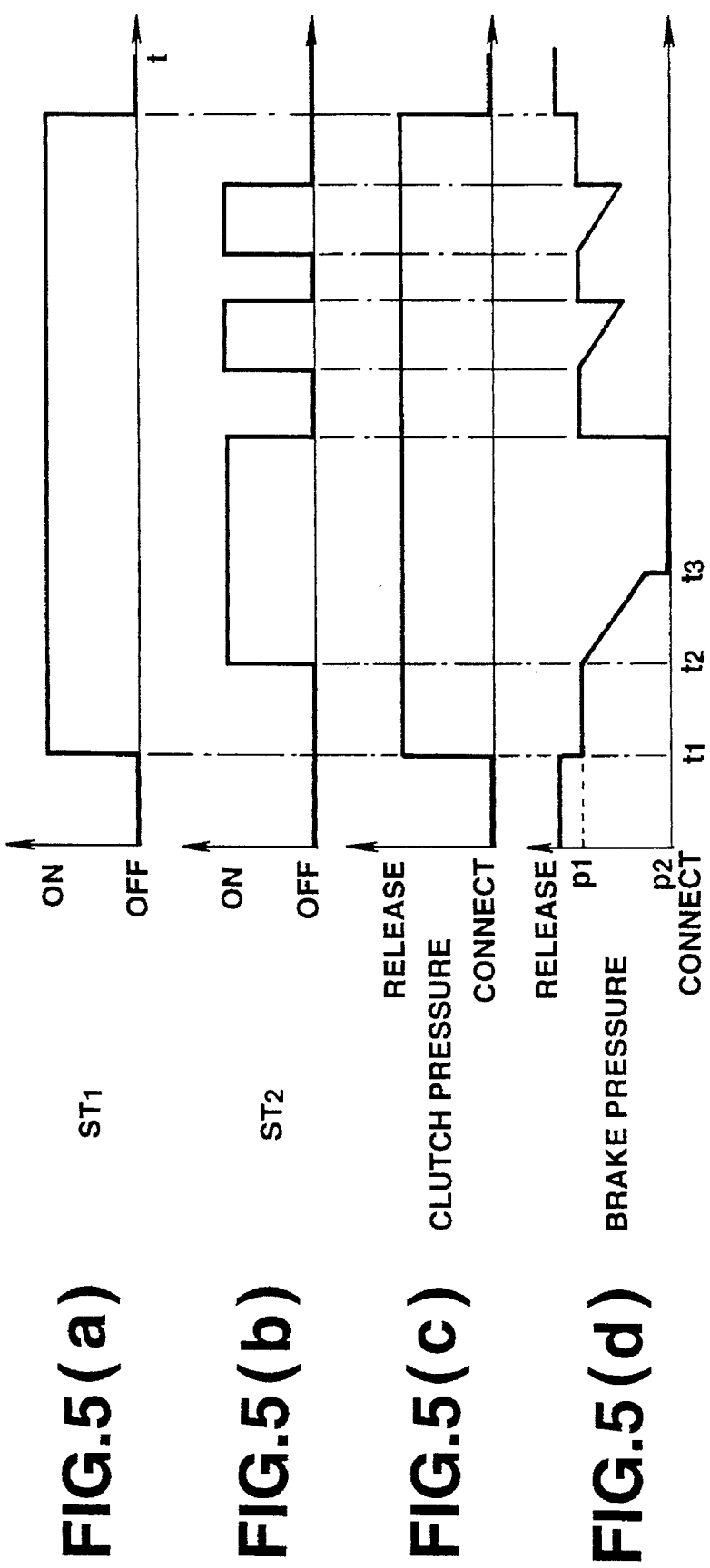

REMOTE CONTROL APPARATUS OF A CONSTRUCTION MACHINE

BACKGROUND OF THE INVENTION

1. Field of the Invention

The present invention relates to an apparatus for controlling the operations of a construction machine such as a bulldozer, a power shovel at a remote location.

2. Description of the Related Art

At a site where restoration work is carried out for the damage caused by disaster or a site where dangerous construction work is carried out, there often arises an occasion that operations of a construction machine such as a bulldozer are remotely controlled. In the remote control, two types of radio control signal are used. One is analog signal and the other is on/off type digital signal. A system using analog signals has a high operability. However, it is expensive, and moreover, signal transmission capacity is small in which a limited number of channels can be used each operable at a low speed. On the other hand, a system using digital signals is inexpensive and can use a large number of channels (approximately 20 channels). For these reasons, the digital signal system is often employed in the field of construction machines in which a various kinds of signals are transmitted.

The system using an on/off type radio control signal cannot transmit a signal whose value ranges between the neutral state and the full working state. For example, there is a conventional bulldozer of a type which performs turning movement by means of a steering clutch and a steering brake. In the conventional bulldozer, the turning movement is performed by an on/off command issued from the steering clutch side and an on/off command issued from the clutch side. Such conventional bulldozer cannot perform a fine control of the turning movement so that an operator often feels unpleasant shocks during operation due to the vibration of the body of the bulldozer and turning movement cannot be achieved as desired.

Further, for raising and lowering working tools such as a blade and a ripper, the same problems as mentioned above are likely to occur, especially at the start of the operation.

SUMMARY OF THE INVENTION

Accordingly, an object of the present invention is to provide a remote control apparatus for construction machines capable of performing a smooth start operation with an excellent fine control performance.

According to one aspect of the present invention, there is provided a remote control apparatus of a construction machine including left and right steering clutches for connecting and disconnecting the transmission of a force of an engine to left and right drive tumblers, and left and right steering brakes for independently braking the left and right drive tumblers and adapted to execute steering control by hydraulically controlling the steering clutches and the steering brakes, wherein the remote control apparatus comprises remote operating means for generating a first steering command for turning on or off the steering clutches of the construction machine and a second steering command for turning on or off the steering brakes of the construction machine, steering operation of the construction machine being controlled by the first and second steering commands; and control means provided in the construction machine, for performing the control in such a manner that when the first steering command becomes on, the steering clutches are released for a duration during which the first steering command is on, and when the second steering command becomes on in the duration during which the first steering command is on, hydraulic pressure of the steering brakes is gradually changed from a releasing side to a braking side with a predetermined gradient.

With this construction, in controlling quick turning (pivot turning) of the construction machine in which one of the steering clutches is turned off and associated one of the steering brakes is turned on, hydraulic pressure of the steering brake is controlled in such a manner that it is gradually changed from the releasing side to the braking side with a predetermined gradient. Thus, a slow pivot turning can be performed at the start of the turning.

According to another aspect of the present invention, there is provided a remote control apparatus for a construction machine which performs works of various types by hydraulically controlling working tools provided therein, wherein the remote control apparatus comprises remote operating means for generating various kinds of working tool commands for turning on and off various movements of the working tools so as to remotely control the construction machine by the working tool commands; and control means provided in the construction machine, for controlling hydraulic pressure of the working tools such that the hydraulic pressure gradually moves from a predetermined value of an intermediate level to a maximum value when the working tool commands become on.

With this construction, when the construction machine starts to perform a given operation, the operation can be started slowly and smoothly.

As is apparent from the above description, according to the present invention, when the construction machine is operated at a remote location by employing an on/off system, moderated control is applied to the operations of the construction machine when the construction machine starts to execute steering control or other given operations. This makes it possible that the construction machine smoothly moves with sufficiently fine control performances at the start of operations.

Other objects, features and advantages of the present invention will become apparent from reading of the following description which has been made in conjunction with the following description.

BRIEF DESCRIPTION OF THE DRAWINGS

FIGS. 5(a) to 5(d) are timecharts illustrating steering control operations according to the present invention;

DESCRIPTION OF THE EMBODIMENT

The present invention will now be described in detail with reference to the accompanying drawings which illustrate a preferred embodiment in which a wording machine is a bulldozer as an example.

Figure 2:
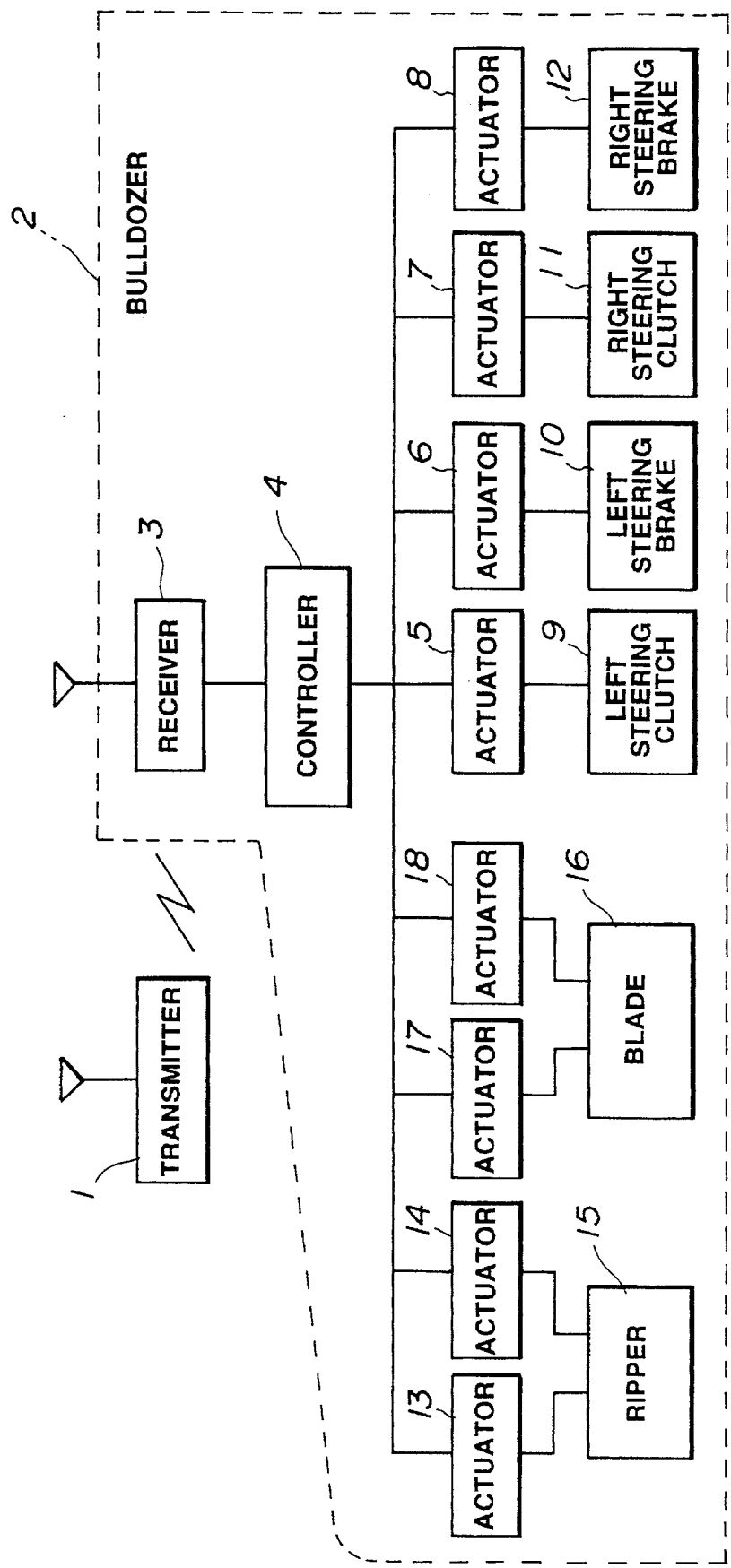
FIG. 2 is a block diagram illustrating the embodiment of the present invention.

Referring to FIG. 2, in a bulldozer 2, various kinds of control command signals are transmitted from a wireless transmitter 1 which is remotely located from the bulldozer 1 and handled by an operator. A receiver 3 mounted on a bulldozer 2 receives control command signals from the transmitter 1, and subsequently, outputs the received control command signals to a controller 4. Each signal transmitted from the transmitter 1 to the receiver 3 is a binary digital signal which is transmitted through corresponding transmission channel.

Since the present invention concerns the control of turning movement of the bulldozer 2 and the control of working tools, FIG. 2 shows only the structure associate with these controls.

The turning movement of the bulldozer 2 is controlled by a left steering clutch 9, a left steering brake 10, a right steering clutch 11, a right steering brake 12 and actuators 5 to 8 for driving these clutches and brakes. More particularly, the turning movement controlling system is constituted by left and right steering clutches 9 and 11 for independently connecting or disconnecting the rotational force of an engine, and left and right brakes 10 and 12 for independently braking a driven wheel (not shown) after the rotational force given to the driven wheel from the engine is disconnected by an associated one of the clutches 9 and 11.

When the transmission of the rotational force of the engine to one of the driven wheels is disconnected by an associated clutch and this disconnected wheel is kept free without being braked, this wheel is dragged while the bulldozer moves by the other one of driven wheel on the opposite side, causing the bulldozer 2 to be slowly turned. When the transmission of the rotational force to one of the driven wheels is disconnected by an associated clutch and subsequently the disconnected wheel is braked by an associated brake, the bulldozer 2 is quickly turned (pivot turn).

The working tool controlling system comprises a ripper 15 and a blade 16 as working tools of the bulldozer 2, ripper actuators 13 and 14 and blade actuators 17 and 18, and controls raising and lowering of the ripper 15, increasing and decreasing the excavation angle of the rippers, raising and lowering of the blade 16 and tilting of the blade 16 in the leftward/rightward direction.

Figure 3:
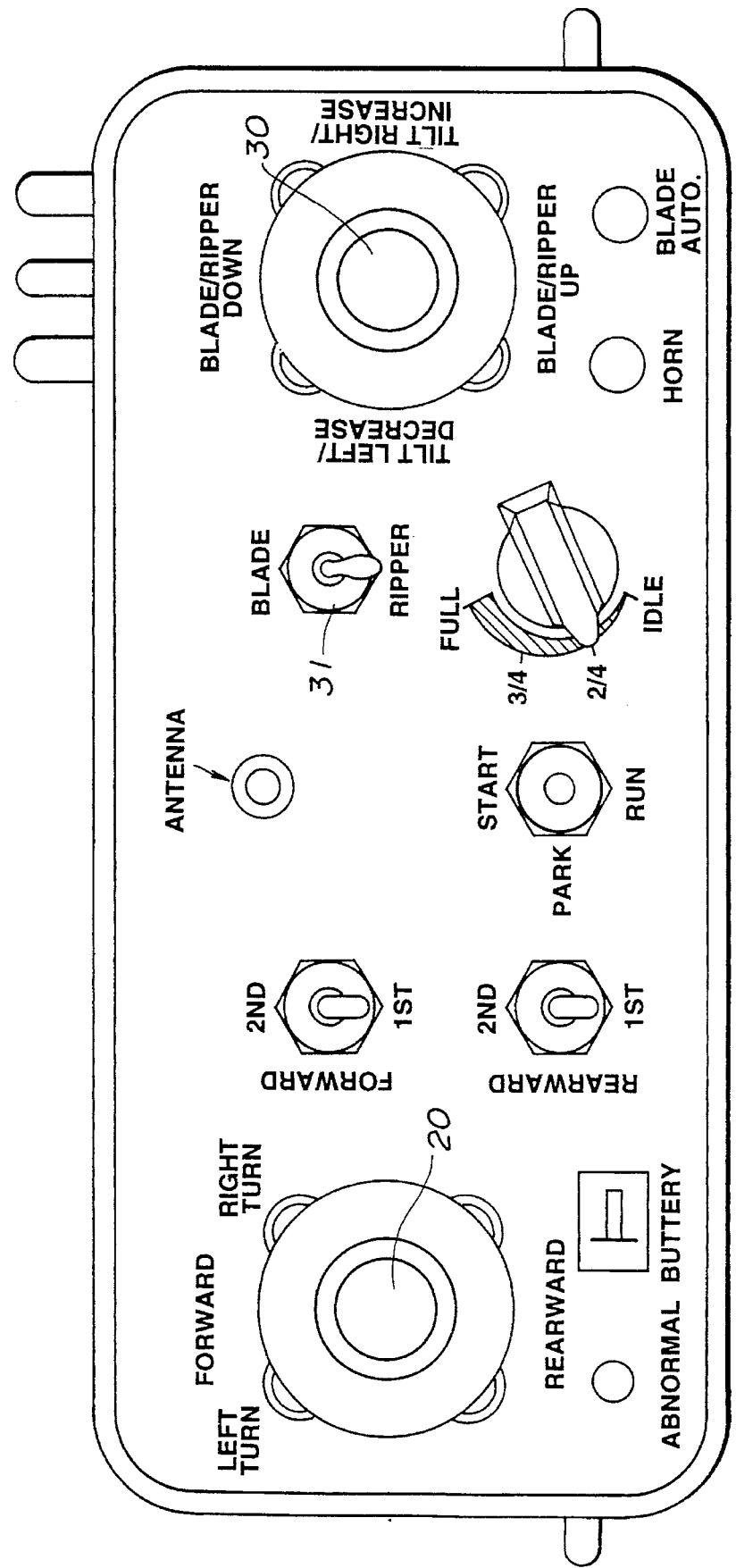
FIG. 3 is a view illustrating an example of the operation panel for a radio control unit.
Figure 9:
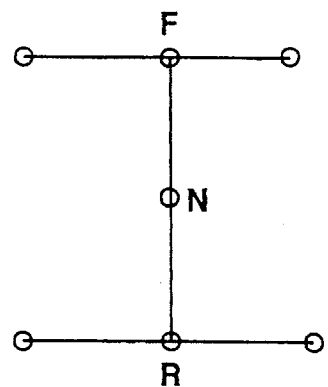
FIG. 9 is a view illustrating the positions of an. actuating lever for turning movement.

FIG. 3 shows by way of example an operation panel for the wireless transmitter 1, in which an actuating lever 20 for turning movement has, as shown in FIG. 9, seven positions corresponding to the neutral state, forward and rearward movements, the turning in the leftward/rightward directions on the forward side, and the turning in the leftward/rightward directions on the rearward side. When the actuating lever 20 is displaced to the position corresponding to the turning movement of the leftward direction or the position corresponding to the turning movement of the bulldozer 2 in the rightward direction, a first steering signal ST1 is outputted from the controller 4 as shown in FIG. 5(a) so as to turn off the steering clutch 9 or 11. The first steering signal ST1 is prepared separately for the turning movement in the leftward direction on the forward side, the turning movement in the leftward direction on the rearward side, the turning movement in the rightward direction on the forward side and the turning movement in the rightward direction on the rearward side.

Figure 4:
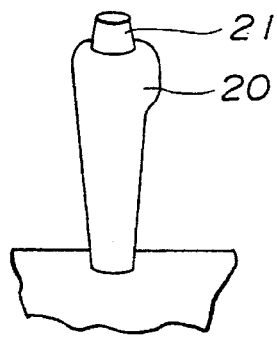
FIG. 4 is a perspective view of an example of an actuating lever disposed on the operation panel shown in Fig. 3.

Referring to FIG. 4, the actuating lever 20 is provided with a brake switch 21 at a knob thereof. When the brake switch 21 is depressed, a second steering signal ST2 is outputted from the controller 4 so as to turn on the steering brake 10 or 12. Specifically, when the brake switch 21 is depressed while the actuating lever 20 is located at the position corresponding to the turning movement in the leftward direction, the second steering signal ST2 for turning the bulldozer 2 in the leftward direction is outputted from the controller 4 in order to drive the left steering brake 10, and when the switch 21 is depressed while the actuating lever 20 is located at the position corresponding to the turning movement in the rightward direction, the second steering signal ST2 for turning the bulldozer in the rightward direction is outputted from the controller 4 in order to drive the right steering brake 12.

For the operation of the working tools, an actuating lever 30 and a changing lever 31 for changing the actuating lever 30 for the blade or the ripper are arranged on the operation panel.

When the changing lever 31 is located on the blade side, the actuating lever 30 has four positions corresponding to raising of the blade, lowering of the blade, tilting of the blade in the leftward direction and tilting of the blade in the rightward direction, and when the changing lever 31 is located on the ripper side, the actuating lever 30 has four positions corresponding to raising of the ripper, lowering of the ripper, increasing and decreasing the excavation angle of the ripper.

As in the actuating lever 20, the actuating lever 30 is provided with a switch such as shown in FIG. 4 which is used to actuates a horn to generate alarm sound.

Figure 1:
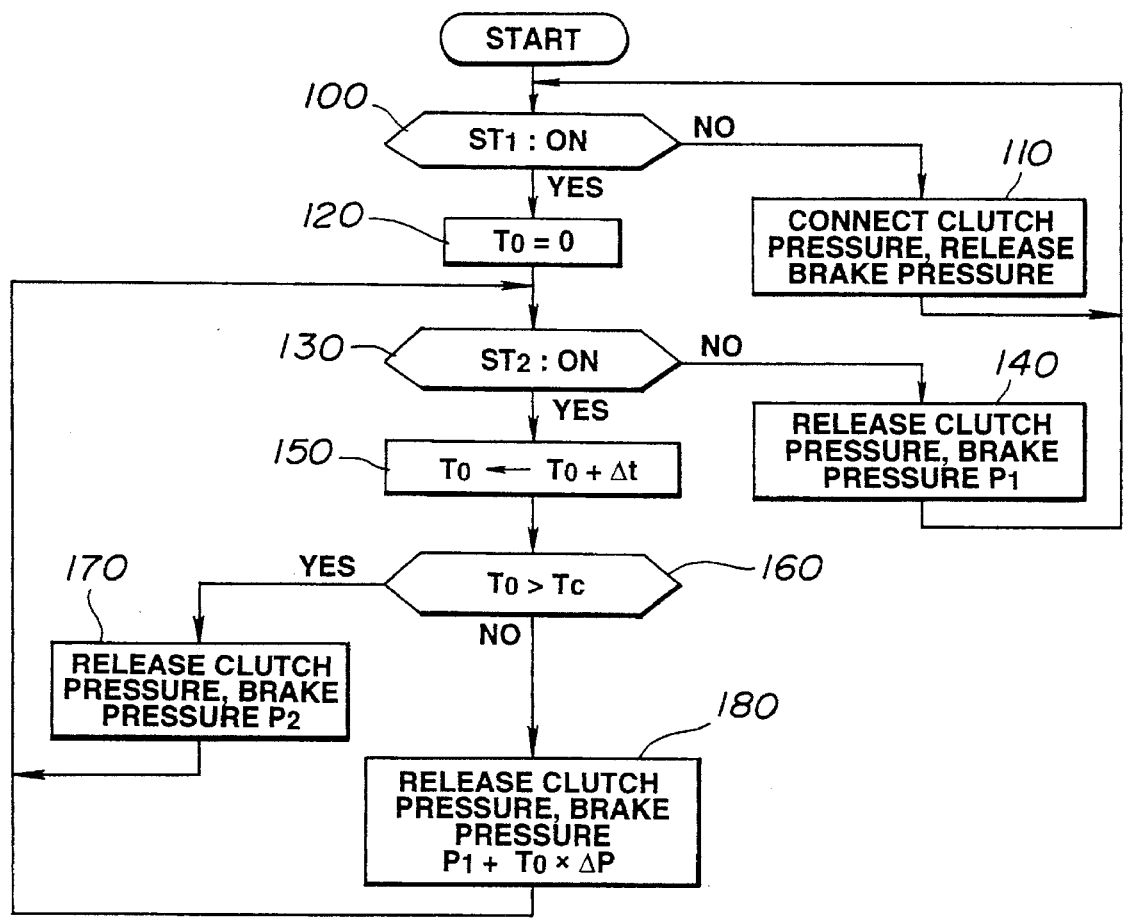
FIG. 1 is a flowchart illustrating the controls to be performed for steering a construction machine in accordance with an embodiment of the present invention.

Now, operations to be performed for turning the bulldozer 2 will be described below with reference to a flowchart shown in FIG. 1 and timecharts in FIGS. 5(a) to 5(d). It is assumed that operations are performed for turning the bulldozer 2 in the leftward direction.

First, an operator operates the actuating lever 20 to the position corresponding to turning in the leftward direction, causing the transmitter 1 to transmit a first steering command ST1 for turning off the left steering clutch 9. When the first steering command ST1 is not received by the receiver 3, the steering clutch 9 is brought in the connected state and the steering brake 10 is released.

Having received the first steering command ST1 via the receiver 3, the controller 4 sets an inner timer provided therein to zero (Step 120), and subsequently, determines whether a second steering signal ST2 is on or not (Step 130). When it is found that the second steering signal ST2 is not on, the steering clutch 9 is turned off, an intensity of hydraulic pressure in the steering brake 10 is reduced to a predetermined pressure P1, and thereafter, this hydraulic pressure P1 is maintained (Step 140 corresponding to time t1 in FIG. 5(c) and FIG. 5(d)).

Thereafter, it is assumed that an operator depresses the push button switch 21 on the actuating lever 20 so as to turn on the steering brake 10. This causes the transmitter 1 to send the second steering command ST2 for turning on the steering brake 10.

Having received the second steering command ST2 via the receiver 3, the controller 4 starts the inner timer to perform a time counting operation (Step 150 corresponding to time t2 in FIG. 5(d)), and subsequently, controls the hydraulic pressure in the steering brake 10 in such a manner as to gradually decrease with a predetermined gradient (Step 160 and Step 180). This moderated controlling to the brake pressure is performed until a value T0 counted by the inner timer exceeds a predetermined time Tc. Once an inequality of T0>Tc is established between the time counted value T0 and the predetermined time Tc, the hydraulic braking pressure is rapidly reduced to a hydraulic connected pressure P2 (Step 170 corresponding to time t3 in FIG. 5(d)).

The moderated controlling performed for the hydraulic braking pressure in the above manner makes it possible to slowly turn the bulldozer 2 while the latter comes in contact with the ground.

The latter half part of the timecharts in FIGS. 5(a) to 5(d) show that the bulldozer 2 conducts inching turn by operator's repeated depressing of the button switch 21 so as to turn the switch 21 on and off repeatedly for a short time. In this case, the moderated controlling performed for the hydraulic braking pressure in the same manner as mentioned above makes it possible to attain inching turn of the bulldozer 2 with an intermediate radius of turning movement.

Figure 6:
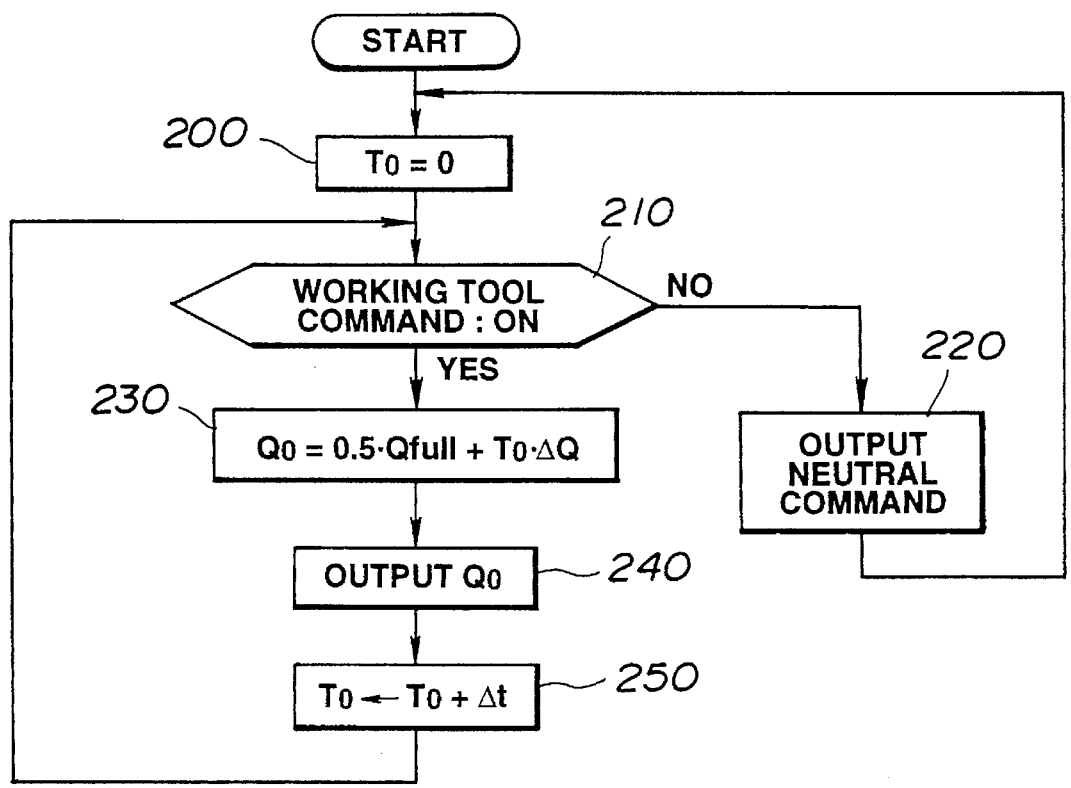
FIG. 6 is a flowchart illustrating operations for controlling a construction machine according to the present invention.
Figure 7A:
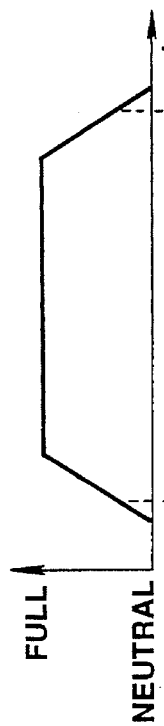
FIGS. 7(a) to 7(c) are timecharts illustrating operations for controlling a construction machine according to the present invention.
Figure 7B:
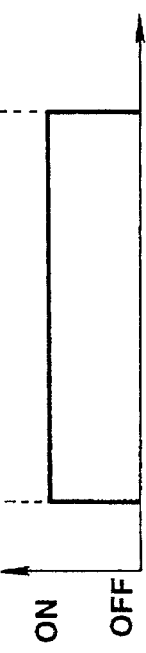
Figure 7C:
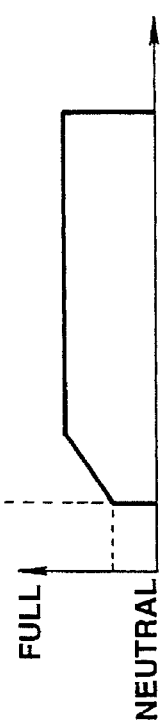

Next, the control of working tools will be described with reference to a flowchart shown in FIG. 6 and timecharts shown in FIGS. 7(a) to 7(c).

According to this embodiment, when the blade 16 is raised or lowered and the ripper 15 is raised or lowered, it is so controlled that a command for an actuator having an intensity of 50% is outputted from the controller 4 at the moment when the operation signal is changed from on to off, and thereafter, the command value is gradually increased until a command intensity of 100% is reached after a predetermined time.

More particularly, first, the controller 4 initializes the inner timer, causing the count value of the inner timer to be set to zero (Step 200). When a command for a working tool is off, the controller 4 supplies a neutral command to the actuator of the working tool (Step 210 and Step 220). Thereafter, when a command for any of the working tools becomes on, the controller 4 outputs an actuator command having an intensity of 50%, and at the same time, starts the inner timer to perform a time counting operation. Subsequently, the controller 4 controls according to the counted value of the inner timer in such a manner that a command value is gradually increased by ΔQ for each Δt (Step 230 to Step 250). For example, the command value may be increased to 100% for a period of one second.

In the above description, the percentages of 50% and 100% are merely examples and other percentages may be used.

The control of the working tools in the above-described manner makes it possible to move the working tools slowly and smoothly at the time of starting operations.

Figure 8A:
FIGS. 8(a) and 8(b) are timecharts illustrating operations for controlling the inching of a construction machine according to the present invention.
Figure 8B:
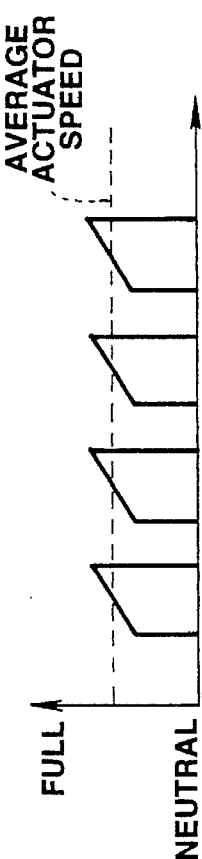

Further, the above-described controlling manner for the working tools makes it possible to set the speed of the working tools to an intermediate value during inching control of the working tools as shown in FIG. 8.

Assuming now that the brake switch 21 is turned on during forward/backward movement of the construction machine when the actuating lever 20 is positioned at the forward movement position or the rearward movement position.

In this situation, the controller 4 for the bulldozer 2 has a function to control the hydraulic pressure in each of the left and right steering brakes 10 and 12 such that the pressure is gradually changed from a predetermined intermediate level to the maximum value in the same manner as mentioned above when the brake switch 21 is turned on during forward/ rearward movement of the bulldozer 2.

With the above-described function, the working tools are smoothly braked when the brake switch 21 is turned on during forward/rearward movement of the construction machine.

In this embodiment, moderated controlling is applied to the operation signal when the operation signal is changed from off to on. Alternatively, the same moderation may be applied to the operation signal in the reverse operation in which the operation signal changed from on to off.

In this embodiment, a wireless remote operation is described. However, the present invention may be applied to a cabled remote operation.

What is claimed is:

1. A steering control apparatus adapted for utilization in a construction machine comprising:

left and right steering clutches for connecting and disconnecting the transmission of a force of an engine of a construction machine to left and right drive tumblers;

left and right steering brakes for braking the left and right drive tumblers, respectively;

receiving means for receiving a first steering command including a clutch-on signal for turning on the steering clutches and a clutch-off signal for turning off the steering clutches and a second steering command including a brake-on signal for turning on the steering brakes and a brake-off signal for turning off the steering brakes, the first and second steering commands being generated and transmitted by separately provided remote operating means; and control means for performing a control of releasing/ connecting hydraulic pressure for the steering clutches in response to on/off of the first steering command received by the receiving means, and for performing a control in such a manner that when the second steering command comes on during a period when the first steering command is on, hydraulic pressure of the steering brakes is gradually changed from a releasing side to a braking side with a predetermined gradient for a predetermined period of time, and when the predetermined period of time elapses, the hydraulic pressure of the steering brakes is rapidly changed to reach a predetermined braking pressure.

2. The steering control apparatus as defined in claim 1 wherein the control means maintains the hydraulic pressure of the steering brakes at a predetermined semi-braking pressure value between a releasing pressure value and a braking pressure value when the first steering command is on and the second steering command is off.

3. A control apparatus adapted for utilization in a construction machine comprising:

a blade which is driven upward and downward;

a ripper which is driven upward and downward;

receiving means for receiving a blade upward signal for turning upward driving of the blade on or off, a blade downward signal for turning downward driving of the blade on or off, a ripper upward signal for turning upward driving of the ripper on or off and a ripper downward signal for turning downward driving of the ripper on or off, the blade upward signal, blade downward signal, ripper upward signal and ripper downward signal being generated and transmitted by remote operation means; and control means for outputting a command value of the blade upward driving in such a manner that the command value has a value of a predetermined intermediate level at the beginning which is gradually changed to a maximum value with a predetermined gradient when the blade upward signal received by the receiving means comes on, outputting a command value of the blade downward driving in such a manner that the command value has a value of a predetermined intermediate level at the beginning which is gradually changed to a maximum value with a predetermined gradient when the blade downward signal received by the receiving means comes on, outputting a command value of the ripper upward driving in such a manner that the command value has a value of a predetermined intermediate level at the beginning which is gradually changed to a maximum value with a predetermined gradient when the ripper upward signal received by the receiving means comes on, and outputting a command value of the ripper downward driving in such a manner that the command value has a value of a predetermined intermediate level at the beginning which is gradually changed to a maximum value with a predetermined gradient when the ripper downward signal received by the receiving means comes on.

4. A control apparatus adapted for utilization in a construction machine comprising:

left and right steering brakes for braking left and right drive tumblers, respectively;

receiving means for receiving a forward/rearward movement command for commanding forward/rearward movement of a construction machine and a braking command for turning on or off the steering brakes, the forward/rearward movement command and the braking command being generated and transmitted by remote operating means; and control means for controlling hydraulic pressure of the steering brakes in such a manner that the hydraulic pressure gradually changes from a value of a predetermined intermediate level to a maximum braking value when the braking command comes on while the forward/rearward movement command is received by the receiving means.

* * * * *